Figure 1:
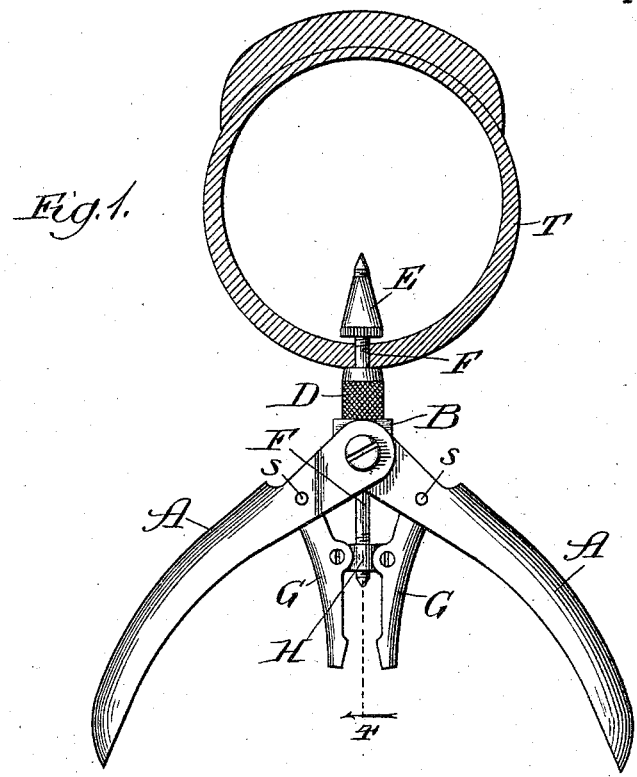

(No Model.) 2 Sheets—Sheet 1.

J. F. PALMER.
TOOL FOR REPAIRING PNEUMATIC TIRES.

No. 537,933. Patented Apr. 23, 1895.

Witnesses
Chas. E. Gaylord
Lute J. Alter

Inventor:
John F. Palmer,
By Dyrenforth & Dyrenforth,
Attys.

THE NORRIS PETERS CO., PHOTO-LITHO., WASHINGTON, D. C.

(No Model.) 2 Sheets—Sheet 2.
J. F. PALMER.
TOOL FOR REPAIRING PNEUMATIC TIRES.
No. 537,933. Patented Apr. 23, 1895.
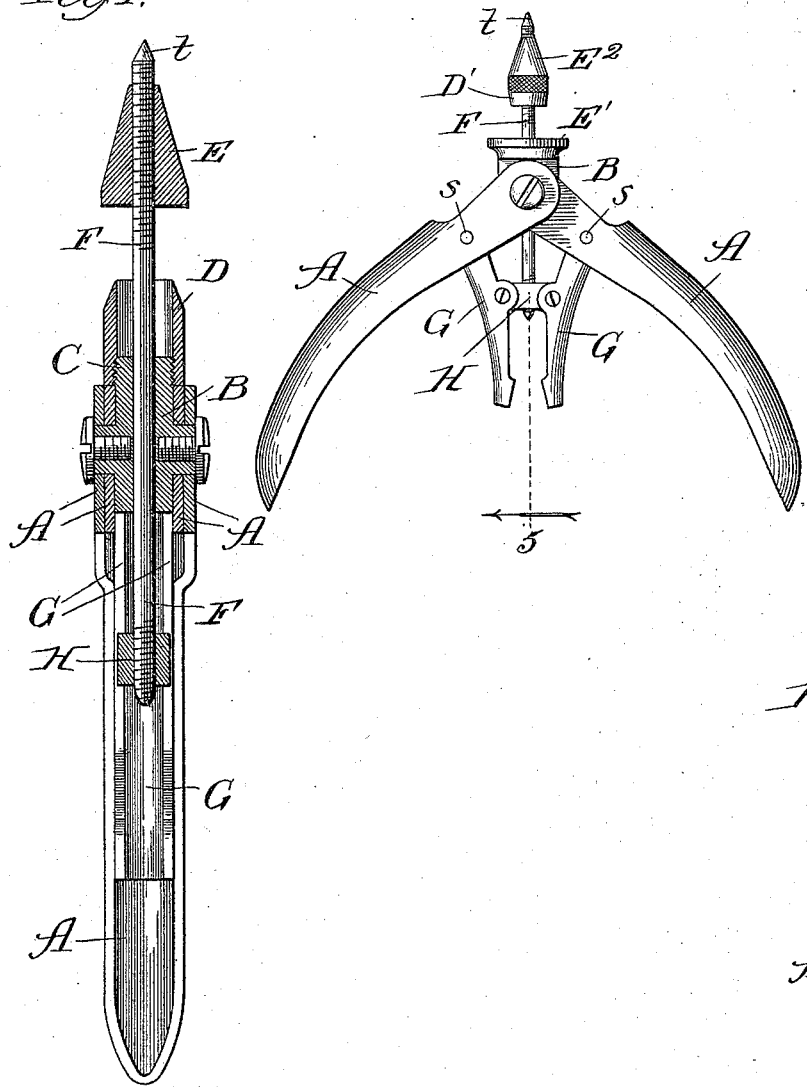
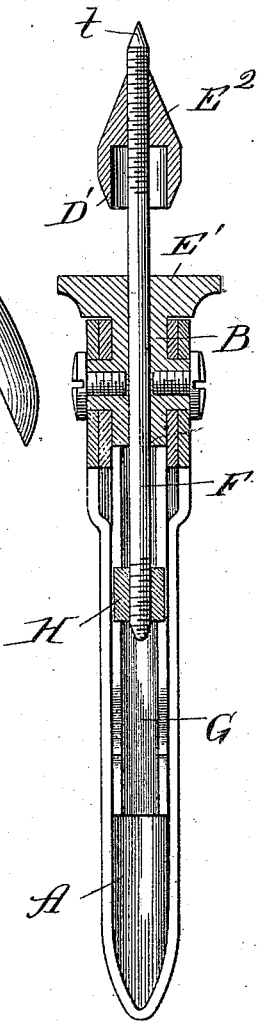
Witnesses:
Inventor:
John F. Palmer,
By Dyrenforth & Dyrenforth,
Att'ys

UNITED STATES PATENT OFFICE.

JOHN FULLERTON PALMER, OF RIVERSIDE, ILLINOIS.

TOOL FOR REPAIRING PNEUMATIC TIRES.

SPECIFICATION forming part of Letters Patent No. 537,933, dated April 23, 1895.

Application filed November 27, 1894. Serial No. 530,171. (No model.)

*To all whom it may concern:*

Be it known that I, JOHN FULLERTON PALMER, a citizen of the United States, residing at Riverside, in the county of Cook and State of Illinois, have invented a new and useful Improvement in Repair-Tools, of which the following is a specification.

My invention relates to a tool for use in effecting the repair more particularly of rubber tubing or hose, but which is adapted for use in repairing other articles the interior of which is not readily accessible.

In repairing punctures in bicycle tires it is common to use a so-called umbrella plug, which is a plug made of rubber vulcanized in a soft condition and having a flanged head the edges of which taper, which plug is introduced into the wall of the tire in such manner that the flange or head-portion is on the interior, the plug being held in the aperture by cement. Such a plug while useful in all forms of pneumatic tires, has particular advantages for the repair of the so-called Palmer tire which employs, instead of canvas as a strengthening medium, two series of individual threads out of contact with each other and by reason of their arrangement exerting a contracting action upon the rubber when the tire is expanded. It follows that when a plug of this nature is introduced through a perforation in a collapsed Palmer tire the effect of expansion of the tire is to grip the plug between coacting threads so firmly as to make the use of cement for the purpose of holding the plug in place unnecessary. The use of cement is always advisable, however, for obvious reasons.

Heretofore in using plugs of the nature here described for the repair of pneumatic tires, difficulty has been found in insuring perfect and uniform contact between the wall of the tire and the surface of the plug owing to the fact that the plug is necessarily round, it being impracticable to make it for stock use in other shapes, while the perforation is irregular in outline, and it has been difficult to change the nature of the outline of the perforation owing to the impossibility of access to the interior of the tire.

My invention involves a tool having two characteristic parts and it may, therefore, be termed a combination tool. One of these parts constitutes a cutting-die adapted to be forced through the perforation or puncture and to cut a hole, usually circular in outline, through the wall of the tire, thus giving to the perforation a uniform configuration. The other feature of the tool is a gripping and holding device for the plug which may thereby be readily forced through said hole so that the head or flange is on the interior of the tire, and may be drawn outward to produce close and intimate contact between the flange or head and the interior wall.

My invention consists in the general and specific details of construction and combination of parts all as hereinafter more fully set forth.

Figure 2:
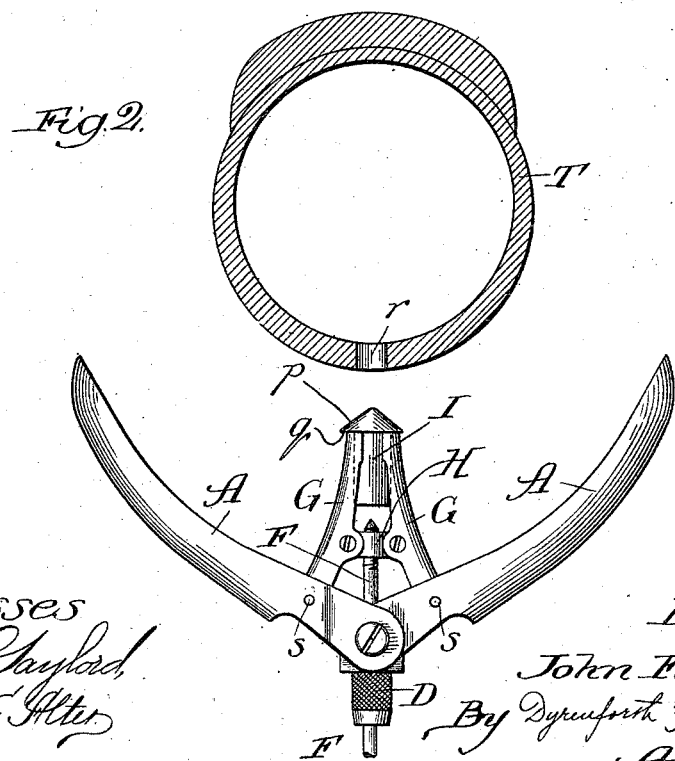

In the drawings—Figure 1 is a view in elevation of my improved repairing tool shown introduced for cutting into a tire. Fig. 2 is a similar view showing my improved repairing tool with a part of the cutting mechanism omitted for lack of space and representing the mode of using the tool for introducing a T-headed plug. Fig. 3 is a view in elevation of a modified form of repairing tool. Fig. 4 is a vertical, transverse sectional view on the line 4 of Fig. 1; and Fig. 5 is a similar view on the line 5 of Fig. 3. The sectional views are all viewed in the direction of the arrow.

A A represent arms pivoted to a common center, B, in the form of a longitudinally perforated plug. The arms afford a grip-lever operating handle on the tool. On the plug B is a screw-threaded hollow extension C which receives the hollow screw-threaded and milled cutting-die D. The co-acting head E of the cutting-mechanism is in the form of a tapering longitudinally screw-threaded plug which is supported upon the screw-threaded extremity of a rod or stem F. The stem F is pointed, as shown at *t*, and passes through the center of the plug B in which it has free longitudinal movement.

Projecting forward from each arm A is an arm G which is pivotally connected to the arm A as indicated at *s* and at its outer end, preferably throughout its length, is semi-tubular as shown. The two arms G, G, are held together at an intermediate point by a centrally perforated and screw-threaded brace H. The lower end of the rod F is screw-threaded to enter and be held in the brace H. The operation is as follows: The arms A being separated, the head E supported on the movable stem F is caused to project away from the cutting-head D, and is thereupon forced through the puncture in the tire until it enters the same, as indicated in Fig. 1. Bringing the arms A toward each other causes the stem F to move inward thereby bringing the head E toward the cutting-head D with the effect of cutting through the wall of the tire a hole having the measurement of the knife-edge of the cutter D. The tool is thereupon reversed, the arms A in their closed position causing the separation of the gripping-faces of the arms G. A plug I is placed between these gripping-faces as indicated in Fig. 2, and the arms A are thereupon separated to cause the grippers to hold the plug and the latter thus held is forced through the hole $r$ previously formed in the tire and withdrawn until the inner face $q$ of the flange-head $p$ is in close contact with the inner wall of the tire T. The arms A are thereupon brought together separating the grippers G, and the projecting part of the plug I is cut off to be flush with the outer surface of the tire. I usually prefer to introduce into a perforation $r$ a plug I of greater diameter than the perforation, whereby the walls of the tire are caused by their elasticity to grip more firmly upon the plug. The flexible nature of the edges of the head $p$ of the plug permit its ready introduction through a hole of smaller diameter.

In the modification illustrated in Fig. 3, the plug B is provided on its upper face with a head E′ instead of the cutting-head D, while the stem F carries at its extremity a plug E² having at its lower end an annular knife-edge D′. In all other respects the structure of Fig. 3 is identical with that of Fig. 1, and the operation is the same in all particulars, except that the cutting, instead of being performed from the exterior toward the interior of the tire, is performed outwardly.

It will be understood that the cutting-members D and E², respectively, as well as the head E, when that form of tool is employed, are readily removable and replaceable, whereby a different sized cutting mechanism may be substituted.

It is to be understood that the invention lies in the tool hereinbefore described and is not in any sense limited to the nature of the material or the characteristics of the article to which it is applied. Hence, while I have described it particularly in its use upon a pneumatic tire, it is to be understood as equally capable of use with any other article where the conditions are the same; and while I have described it particularly in connection with the T-headed plug or umbrella plug shown in the drawings it is not to be understood as limited to such use.

What I claim as new, and desire to secure by Letters Patent, is—

1. A tool comprising arms upon a common pivot, a bearing pivotally supported between said arms, a stem movable through said pivot and fastened at one end to said bearing, and cutting-members, one on the outer end of said stem and the other carried by the pivot, substantially as described.

2. A cutting-tool comprising arms upon a common pivot, such as a plug B, a stem F movable through said pivot and having at one end a double connection with the arms and at the other end one member of a cutting-mechanism, in combination with the cutting-mechanism comprising two members, one carried by the stem and the other carried by the pivot, substantially as described.

3. A tool comprising, in combination, arms A having a common pivot B, forwardly extending pivotally joined arms G pivotally connected to the arms A, a stem F connected at one end to the pivotally joined arms G and projecting through the pivot B to move freely therein, and cutting-mechanism comprising an outwardly tapering member carried by the stem F, and a fixed member carried by the pivot B, substantially as described.

4. A tool, comprising, in combination, the arms A having the common pivot B, the arms G pivotally joined together and pivotally connected to the arms A, respectively, said arms G having co-acting gripping faces at their free ends, a stem F joined at one end to the connection between the arms G and passing to move freely through the pivot B, and a cutting-mechanism comprising an outwardly tapering member secured to and movable with the stem F and a member held by the pivot B, substantially as described.

JOHN FULLERTON PALMER.

In presence of—
J. N. HANSON,
J. H. LEE.